(12) United States Patent
Guo

(10) Patent No.: US 6,779,484 B2
(45) Date of Patent: Aug. 24, 2004

(54) MILKING SYSTEM

(76) Inventor: Fangjiang Guo, 135 Simsbury Dr., Ithaca, NY (US) 14850

( * ) Notice: Subject to any disclaimer, the term of this patent is extended or adjusted under 35 U.S.C. 154(b) by 0 days.

(21) Appl. No.: 10/199,354

(22) Filed: Jul. 19, 2002

(65) Prior Publication Data

US 2004/0011295 A1 Jan. 22, 2004

(51) Int. Cl.$^7$ .............................. A01J 7/04; A01K 1/12
(52) U.S. Cl. ..................... 119/14.03; 119/518; 119/520; 119/14.04
(58) Field of Search .............................. 119/14.03, 516, 119/518, 520, 522, 523, 524, 527, 14.18, 670, 673, 14.04

(56) References Cited

U.S. PATENT DOCUMENTS

| | | | |
|---|---|---|---|
| 3,536,045 A | | 10/1970 | Flocchini |
| 3,792,686 A | | 2/1974 | Needham et al. |
| 3,810,442 A | | 5/1974 | Jacobs et al. |
| 3,828,733 A | | 8/1974 | Correia |
| 3,877,419 A | | 4/1975 | Rodger |
| 3,885,528 A | * | 5/1975 | Vandenberg ............. 119/14.03 |
| 3,937,297 A | | 2/1976 | Jacobs et al. |
| 4,000,718 A | * | 1/1977 | Brown ..................... 119/14.03 |
| 4,207,837 A | | 6/1980 | Schwartau et al. |
| 4,261,292 A | | 4/1981 | Le Du |
| 4,419,961 A | | 12/1983 | Vandenberg et al. |
| 4,763,605 A | | 8/1988 | Braum |
| 4,970,992 A | * | 11/1990 | Aiken ........................ 119/673 |
| 4,977,856 A | * | 12/1990 | Norwood ................. 119/14.03 |
| 5,000,119 A | | 3/1991 | Moreau et al. |
| 5,042,428 A | | 8/1991 | Van der Lely et al. |
| 5,119,732 A | | 6/1992 | Lisy |
| 5,140,942 A | | 8/1992 | Flocchini |
| 5,203,280 A | * | 4/1993 | Nelson .................... 119/14.03 |
| 5,361,722 A | * | 11/1994 | Tecza ...................... 119/14.03 |
| 5,379,701 A | | 1/1995 | Sumi et al. |
| 5,483,921 A | | 1/1996 | Waybright |
| 5,535,700 A | * | 7/1996 | Boudreau ................... 119/651 |
| 5,615,637 A | * | 4/1997 | Nelson .................... 119/14.03 |
| 5,722,350 A | * | 3/1998 | Marshall ..................... 119/673 |
| 5,768,997 A | | 6/1998 | Meier |
| 5,878,692 A | * | 3/1999 | Ornerfors ................ 119/14.08 |
| 5,959,526 A | * | 9/1999 | Tucker .................... 340/572.1 |
| 6,205,949 B1 | | 3/2001 | van den Berg |
| 2003/0150397 A1 | * | 8/2003 | Veen .......................... 119/673 |

* cited by examiner

*Primary Examiner*—Yvonne R. Abbott
(74) *Attorney, Agent, or Firm*—Brian B. Shaw; Roger Aceto; Harter, Secrest & Emery LLP

(57) ABSTRACT

A milking system including apparatus and a method for facilitating the milking of a large number of animals in a milking parlor. Milking stalls in the parlor are arranged to provide a one way-path of travel through the parlor with a controlled entry and exit to facilitate pre- and post-milking treatment of the animals. The milking stalls are separated by an operator's pit. A platform or person mover disposed in the pit carries an operator from one milking stall to another wherein the proximity of a working side of the platform to the stalls allows the operator to have direct access to an animal without leaving the platform. Movement of the platform to a given stall is controlled by a controller acting responsive to sensors that indicate the occurrence of an event at the given stall requiring the operator's attention.

23 Claims, 3 Drawing Sheets

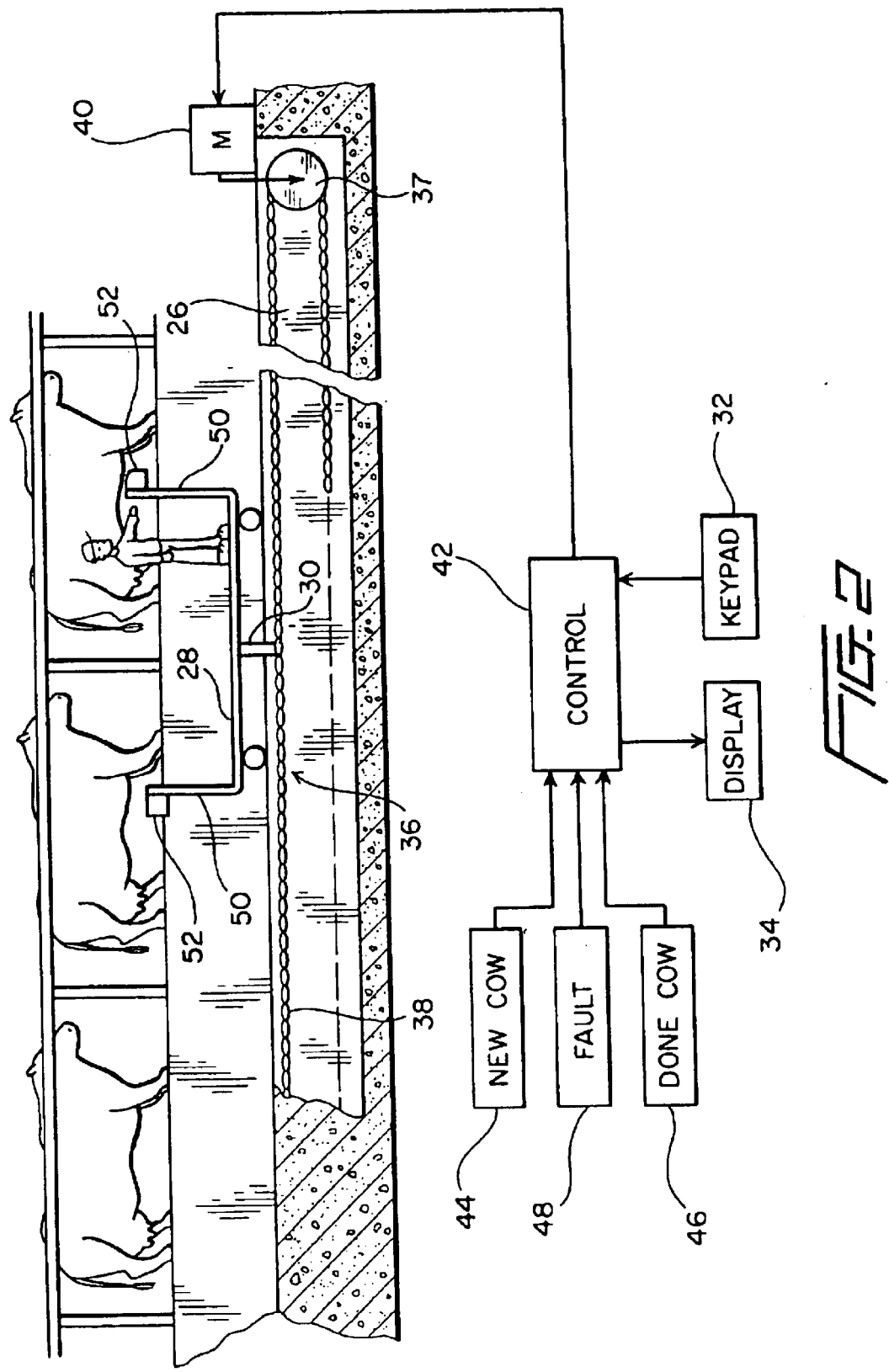

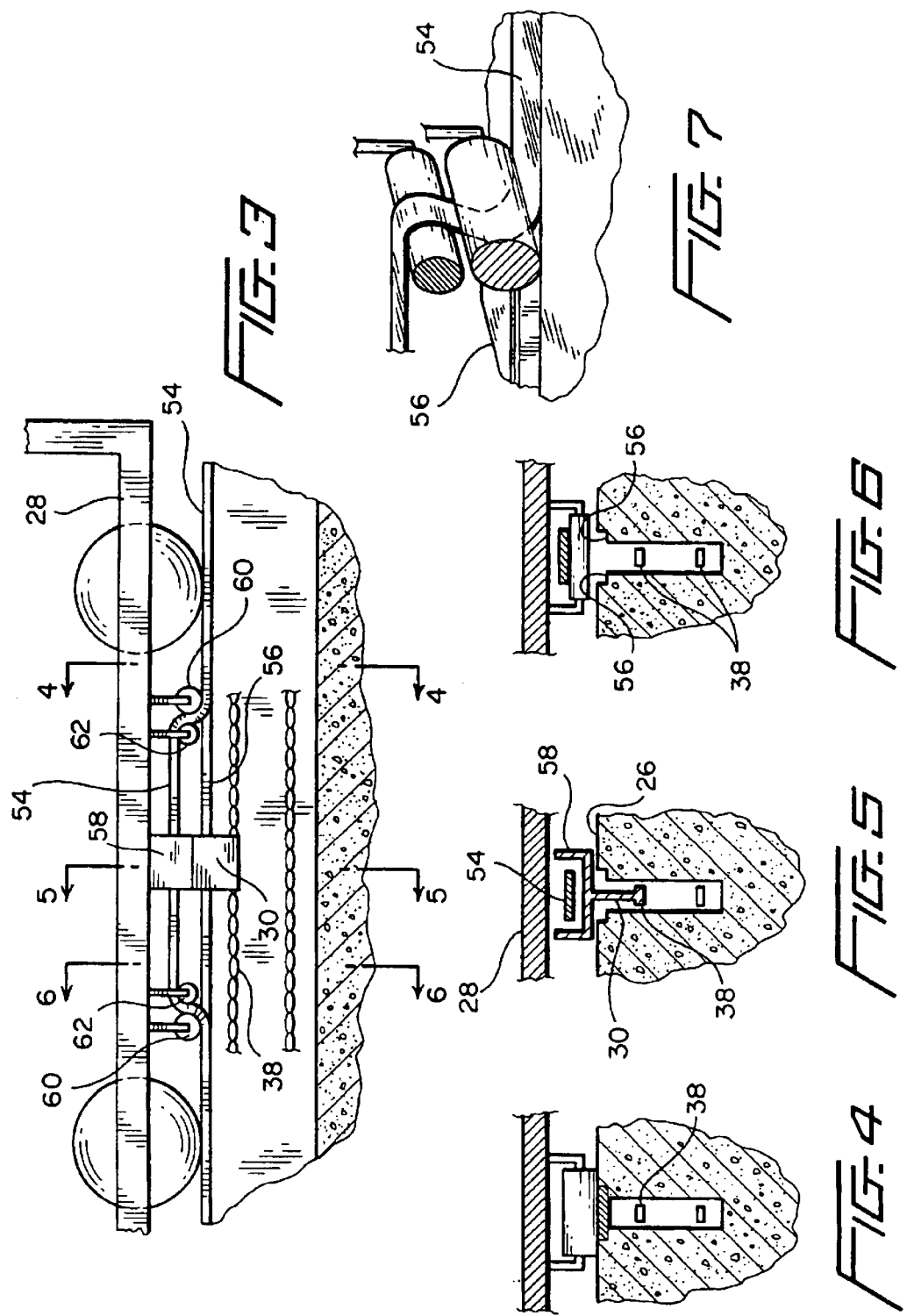

MILKING SYSTEM

FIELD OF THE INVENTION

The present invention relates to the milking of animals, particularly dairy cows, and more particularly to a system that increases cow through put and at the same time reduces the physical exertion and facilitates movement of a person between a plurality of milking stalls as required to service animals in the stalls.

BACKGROUND OF THE INVENTION

A milking parlor generally includes an array of individual milking stalls, each stall being designed to hold a cow or other dairy animal while being milked. To facilitate the operation, it is known to arrange the stalls in parallel rows separated by a central aisle. The stalls are accessible from the aisle so an operator in the aisle can service the animals in both rows of stalls. It also is known to have the stalls elevated relative to the floor level of the aisle. This allows an operator roaming the aisle or pit to service the animal without needing to repeatedly bend over.

The stalls can be arranged in tandem so the animals are head to tail, the stalls can be parallel where the animals are side by side, or the stalls can be at an angle such that the cows overlap each other and form a herringbone pattern. In the parallel arrangement the rear of the animal is towards the aisle. In either case the aisle or pit is relatively long. For example in a tandem arrangement of two rows of six animals each, the overall length of the aisle can have a length of 48 feet or more. In a parallel arrangement the same length can accommodate 18 to 19 animals in each row. In either case the animals are positioned so the operator can have direct access to the animal's udder.

The milking operation generally involves several stages. After the animal has entered the milking stall, the udder first is cleaned in a pre-sanitizing operation often referred to as "pre-dipping" in preparation for milking. The milking apparatus is attached and the animal is milked. After milking, the apparatus is removed and the teats are treated in a post-sanitizing step often referred to as "post-dipping". Depending upon the degree of automation, one or more of these operations can be accomplished by mechanical means. For example, the pre- and post-dipping operations can be accomplished by dipping or by spraying apparatus and robotic apparatus can attach the milking cups. Generally, however, the milking operation is labor intensive.

It should be appreciated that with an aisle 48 feet in length, for example, a single operator is kept busy moving from one end to the other to service all the animals. Some animals may take longer to milk than others so the operator may be at one end of the aisle attaching the milking apparatus to a fresh animal while an animal at the other end of the aisle is done milking. Thus, the operator may have to move from one end of the aisle to the other to successively service the two animals. The effort of moving between animals is compounded should a fault occur such as when one or more cups of the milking apparatus is inadvertently removed from the animal prior to the completion of the milking operation. This could happen for example by the animal kicking the cups off or by the cups simply falling from the animal. In any event, the operator is in constant motion, sometimes back and forth for the full length of the aisle, in order to service the animals in the milking stalls.

Various devices have been developed to facilitate the movement of the operator between animals. For example U.S. Pat. No. 3,937,297 discloses a mobile milking chair that is controlled by the operator to place the operator in position to milk a series of cows. The chair is mounted on a platform and can move relative to the platform to position the operator adjacent a cow. In addition, the platform is movable along a track on the aisle floor to carry the operator from one end of the aisle to another.

In U.S. Pat. No. 5,768,997 a frame suspended from a track attached to the ceiling of the milking barn carries the milking chair. The frame is movable along a track from one end of the barn to the other. The chair in turn is movable both vertically and laterally with respect to the frame to locate the operator adjacent the animal to be milked. Foot switches control movement of the frame and chair.

A problem inherent with milking chairs of the types described in these patents is that the operator is not free to access the animal without first activating controls for positioning the chair adjacent the animal. This may delay response time in addressing a fault occurring during the milking operation. Also, with operator controlled milking chairs the operator must react to an event in order to cause the positioning of the chair at a location where his services are needed. For example, the operator must react to the entry of a fresh animal into a milking stall by manually activating controls to reposition the chair adjacent this animal. Likewise the operator must manually react to some indication that milking is done or has been interrupted, locate the stall where the animal is located and then direct the chair to that location.

Another problem is that milking chairs movable along a track in the floor must contend with the fouling of the track with manure and other debris falling on and into the track from the elevated milking stall.

Accordingly, it is an object of the present invention to provide an improved milking system that lessens the physical effort required to service a large number of animals in a milking parlor.

Another object of the present invention is to provide an improved milking system that reduces some of the repeatable milking procedures such as pre-sanitizing or post-sanitizing an animal's teats.

Yet another object is to provide a milking system that moves an operator to a selected milking stall and allows the operator direct access to the animal with a minimum of effort.

A further object of the invention is to provide an improved milking system using an in-floor track and drive system to deliver an operator to a selected milking stall wherein the track and drive are protected from external contaminants.

SUMMARY OF THE INVENTION

In the milking system of the present invention, the milking stalls in the milking parlor are arranged in parallel rows on either side of an aisle. The animals entering and leaving the milking parlor move in a one-way path from an entrance into the parlor to an exit. For example, the path of the animals on entering the milking parlor passes through an entry stall where each animal is held briefly so the pre-dipping procedure can be performed. After sanitizing the animal is directed from the entry stall and along the path to the next available milking stall. After milking, the animal is directed from the milking stall to an exit of the milking parlor. At the exit each animal is briefly held in an exit stall so the post-dipping procedure can be performed. Both the pre and post-dipping procedures can be performed either manually or by robot or automatic devices using appropriate washes, sprays or dips.

The aisle extending between the rows, preferably, is at a lower elevation than the level of the milking stalls. This aisle, hereafter referred to as the "operator pit" allows an operator to service an animal in the milking stall without stooping or bending. The floor of the pit has a slot and an endless chain travels in the slot for moving a platform along the pit. The platform has a working side facing a row of milking stalls that extends close to the pit wall. From the platform in the operator pit, an operator can access the row of milking stalls adjacent the working side of the platform without leaving the platform. The proximity of the working side of the platform to the pit wall provides a safety means that prevents an operator from inadvertently stepping from or falling off the platform at the working edge.

A controller acting independently of the operator to decide where the operator's services are needed controls the movement of the platform. In this respect the controller receives input signals from a plurality of sources. The sources may include, for example, an occupancy sensor indicating when a fresh cow has entered a given milking stall and a sensor indicating when the milking is done or when a fault has occurred during the milking. Each of these events may initiate the movement of the platform from one stall to another.

The controller, prior to moving the platform, alerts the operator that the platform is going to be moved. After the operator acknowledges the alert, the controller moves the platform to the selected location. Both for safety reasons and sanitary reasons, provision is made for the slot opening in the aisle floor to be covered. In accordance with one embodiment of the invention the covering for the slot is fixed against longitudinal movement but is systematically lifted from and laid back into the slot to accommodate the movement of the platform.

Accordingly, the present invention may be characterized in one aspect thereof by a milking system comprising a milking parlor having an entrance and an exit. In the parlor a plurality of milking stalls are arranged along a one-way path of travel through the milking parlor from the entrance to the exit and at least one of the entrance and exit comprising a sanitation position including means for detaining an animal while a pre- or post-dipping procedure is performed on the animal.

In another aspect, the present invention may be characterized by a milking system wherein the milking stalls in the parlor are arranged in two parallel rows separated by an elongated operator pit extending substantially the full length of the parallel rows. Each stall is accessible from the pit and the stalls are at an elevated level relative to the floor level of the pit. Located in the pit is a guide extending substantially the full length of the pit. A platform in the pit is movable along the guide and has a working side facing at least one of the rows of stalls that extends to a wall of the pit. This allows an operator standing on the platform to have direct access to animals in at least one of the rows. Also, the proximity of the working side to the pit wall provides a safety feature to prevent the operator from stepping or falling off the working side and into the pit. A drive means is provided for moving the platform along the guide and stopping the platform adjacent a selected one of the milking stalls so the operator can service an animal at the selected milking stall.

Preferably, a sensor is located at each milking stall. The sensor is adapted to issue a signal on the occurrence of an event such as the entry of an animal to be milked into a milking stall, the disengagement of a milking cup from an animal in the milking stall or the completion of the milking of an animal in the milking stall. A controller is provided that can act in response to the signal to cause the movement of the platform or person mover to the milking stall that is the source of the signal.

In still another aspect, the present invention is characterized by a method for operating a milking parlor comprising:

a) arranging the milking stalls along a one-way path of travel from an entry stall to an exit stall; and b) detaining an animal at one of the entry stall and exit stall to perform respectively one of a pre- and a post-dipping procedure on the detained animal.

In connection with this method, the milking stalls can be arranged in parallel rows separated by a central aisle and then moving a person mover along the aisle to a selected one of the milking stalls in response to the sensing of an event occurring at the selected stall. The event, for example can include one of the entry of an animal into a stall, the disengagement of a milking cup from the animal and the completion of the milking of the animal.

DESCRIPTION OF THE DRAWINGS

FIG. 2 is an elevation view of the milking parlor and includes a block diagram of the control for the milking system of the present invention;

FIG. 3 is a view showing a portion of the apparatus of FIG. 2 in greater detail;

FIGS. 4, 5 and 6 are views taken generally along lines 4—4, 5—5 and 6—6 respectively of FIG. 3; and FIG. 7 is a perspective view partly in section showing a portion of the apparatus of the present invention.

DETAILED DESCRIPTION OF THE INVENTION

Figure 1:
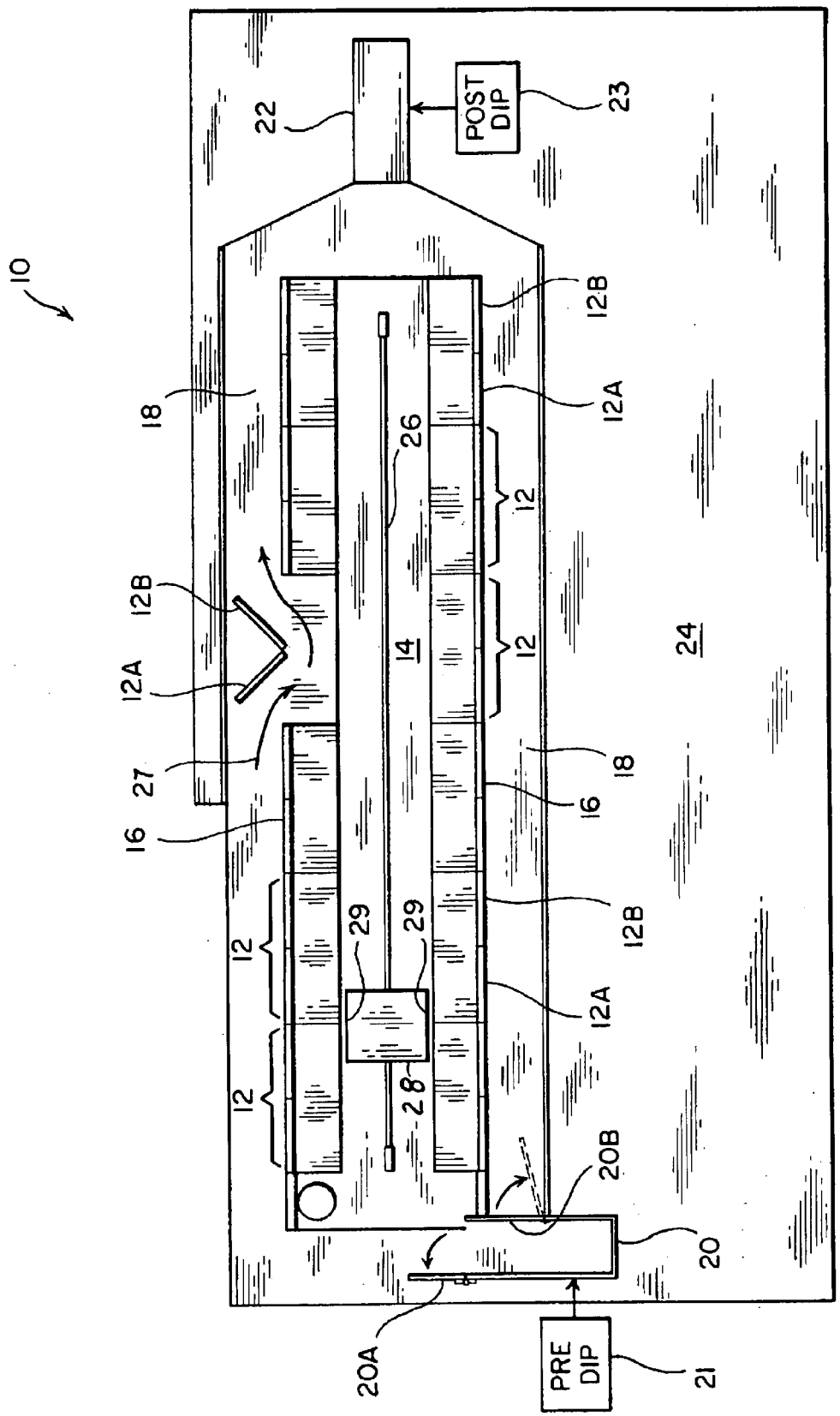
FIG. 1 is a plan view of a milking parlor including an embodiment of the milking system of the present invention.

Referring to the drawings, FIG. 1 shows a milking parlor incorporating a milking system of the present invention including a milking parlor generally indicated at 10. The milking parlor has an entry including an entry stall 20 and an exit stall 22. A plurality of milking stalls 12 is arranged along a one-way path of travel from the entry stall 20 to the exit stall 22. As shown in FIG. 1, the milking stalls 12 are arranged in two parallel rows on either side of a central aisle or operator pit 14. This arrangement allows an operator roaming the central aisle to service animals in both rows. Servicing here means that the operator can tend to the cleaning of the animals' udders, attach a milking apparatus, later remove the apparatus from an animal when it is finished milking, reattach any milking apparatus that is inadvertently detached prior to the completion of the milking operation, and post treat the udder by dipping, spraying or other methods. Preferably, the floor level of the aisle is lower than the floor level of the stalls so an operator pit is formed that extends substantially the full length of the two parallel rows of milking stalls. This allows an operator to service the animals in each stall without stooping.

The milking stalls can be arranged in tandem as shown wherein the animals to be milked are head to tail. While the tandem arrangement results in a relatively long parlor (given an average stall length of eight feet), the tandem arrangement allows the animals to move forward into and out of an individual stall as described further hereinbelow. As an alternative, the stalls can be side-by-side wherein the hindquarters of the animals face the central aisle.

Each of the stalls has a gated side 16 opening to an exterior corridor 18 that runs alongside each of the rows of stalls. For purposes of traffic control, the exterior corridors 18 are both one-way in that they have a single entry stall at one end of the parlor and a single exit stall at an opposite end of the parlor. As shown in FIG. 1, both the entry stall 20 and the exit stall 22 are gated. Animals in the general holding area indicated at 24 enter one at a time through the controlled operation of the gated entry stall 20. In this respect the entry stall has two gates 20A and 20B. Selected operation of one of these gates directs an animal to one or another of the corridors 18. Each of the milking stalls 12 arranged along the corridors in turn has an entry gate 12A and an exit gate 12B in the side 16 of the stalls facing the corridor 18.

As shown in FIG. 1, the opening of an entry gate 12A bars passage down the corridor 18 and directs the animal to move forward into an empty stall. When the animal is done milking, the opening of an exit gate 12B allows the animal to move forward into the corridor, which directs the animal towards the exit 22. According the flow of traffic through the parlor and into and out of individual stalls follows a one-way path in the direction of the arrows 27. It should be appreciated that the various gates 12A, 12B and 20A, 20B are operated selectively so that animals are admitted and leave in an orderly fashion.

Extending substantially the full length of the aisle 14 (referred to hereafter as the "operator's pit") is a slot 26, which opens through the floor surface of the pit. The slot houses a drive means (described further hereinbelow) attached to a wheeled platform 28. The platform is in effect a person mover in that an operator standing on the platform can be carried the length of the pit from one end to the other. In the embodiment as shown in FIG. 1, the platform is generally rectangular and has opposite working sides 29, each facing one of the rows of milking stalls. The working sides of the platform extend out to the adjacent wall of the operator's pit so that in the embodiment shown, the platform has a width that extends substantially the full width of the operator's pit. This allows an operator riding on the platform to directly service the animals in both rows without leaving the platform. Also, by having the working side extend out to the pit wall, the operator is prevented from inadvertently falling from the platform when moving close to the pit wall to service an animal.

Referring now to FIG. 2, the platform 28 is shown to have a bracket 30 that extends down from the platform and into the slot 26. The bracket is attached in the slot to a driven element, generally indicated at 36, that travels in the slot for moving the platform. As shown in the Figure, the driven element comprises an endless chain 38 disposed in the slot, the sprocket 37 for the chain being driven by a motor 40. While an endless chain is shown, the driven element 36 can be a screw, pneumatic or hydraulic ram or any other controllable device movable through the slot.

Operation of the motor 40 is under control of a controller 42. The controller acts to activate the motor in order to position the platform adjacent a selected one of the stalls. In this respect the controller can direct the motor to move the platform either to the left or to the right as viewed in FIG. 2. The controller receives inputs from several sources in order to determine where to position the platform. Any one of several events may trigger the movement of the platform. For example, one of the inputs 44 may be from a sensor located so as to indicate the entry of an animal into a milking stall. Such a sensor could be a sensor in the floor of the stall that is triggered by the weight of the animal. As an alternative, the passage of an animal into a stall may interrupt a light beam or the like wherein the interruption triggers a response.

Another sensor 46 preferably is associated with the milking apparatus for monitoring the flow of milk from the animal. Such a sensor can be a component of a flow meter that issues a signal when the milk flow falls below a predetermined level to signify that the cow is done milking. A third sensor 48 is provided to indicate that the attention of the operator is needed to correct some fault event occurring during the milking of an animal. For example, such a sensor can be one that monitors the suction of milking cups attached to the teats of the animal. In the event of a cup falling off or being kicked off by the animal, the resulting change in pressure signals the fault.

The controller processes the information from the sensors 44, 46 and 48 and then directs the motor to move the platform to the location where the operator's attention is most urgently needed. As any sudden movement of the platform could result in the operator falling from the platform, hand railings 50 are provided at either end of the platform to steady the operator. Attached to one or both of the hand railings 50 at 52 is a keypad 32 and display 34. These are connected to the controller so the operator is provided with readout of relevant information. After the operator notices the information on the display and confirms by an entry on the keypad, the controller will activate the motor for moving the platform to the selected location.

Movement of the platform 28 is by means of the connection to the endless chain 38 within the slot 26. For reasons of safety and to prevent the fouling of the chain 38 (or other drive means in the slot), the opening of the slot through the floor of the aisle preferably is closed with a seal that permits the passage of the bracket 30. One alternative is to have a flexible cover comprising a lip extending inward from the opposite sides of the slot and meeting along a centerline of the slot. The passage of the bracket 30 displaces each lip upwardly to separate or part the two lips and then the lips spring back together after the bracket has passed.

A preferred arrangement for sealing the opening of the slot is shown in FIGS. 3–7. In this respect the flexible cover of the sealing arrangement includes a belt 54 that extends the full length of the slot. The belt spans the slot opening and is supported on shoulders 56 extending along the slot. Thus when the belt is laid onto the shoulders 56 it effectively closes the slot opening. This prevents the entry of manure and other wastes into the slot that might foul the chain drive.

The belt is fixed at its ends (not shown), which prevents the belt from moving longitudinally along the slot. Accordingly, provision must be made to allow the passage of the bracket 30 connected in the slot to the drive chain. In accordance with an embodiment of the present invention and as best seen in FIGS. 3 and 5, the bracket 30 depends from a channel member 58 attached to the underside of the platform 28. The belt 54 is threaded through the channel so the belt rides up and over the channel (and the bracket 30) as the platform travels along the aisle 14. Any suitable means may be provided to displace the belt by lifting it from the slot in advance of the bracket 30 and then returning it to the slot after passage of the bracket. The embodiment as shown uses a pair of rollers 60, 62 connected to the underside of the platform on either side of the channel 58 to facilitate the lifting the belt and then returning it to the shoulders 56. Either pair of rollers operates as a leading pair or as a trailing pair depending upon whether the platform moves to the left or to the right as viewed in FIG. 3.

As shown in FIG. 3, the rollers are arranged side-by-side. The belt is threaded between the rollers so that in the direction of motion of the platform 28 (either to the left or to the right as viewed in FIG. 3), the belt first passes under a leading roller 60 and then over the top of a leading roller 62. Conversely, the set of rollers that trail in the direction of motion has the belt passing first over the top of roller 62 and then under roller 60. For example, as the platform moves to the left as viewed in FIG. 3, the belt 54 passes under the leading roller 60 and over the top of roller 62 (see FIG. 6). In this way the belt is lifted to accommodate the passage of the bracket 30 (see FIG. 5). Then, as the belt passes over the bracket, it goes over the top of the roller 62 and under the trailing roller 60. As the belt passes under the trailing roller 60, it is pressed into the slot and against the shoulders 56 (see FIG. 4). The threading of the belt 54 under and over the two rollers 60 and 62 for removing and returning the belt to the slot 26 also is shown in FIG. 7.

In operation, animals in the holding area 24 are herded towards the entry stall 20. They enter one by one and are detained in the entry stall to permit the pre-dipping operation. The animals may be manually pre-dipped in the entry stall. As an alternative, a robotic or automatic pre-dip apparatus 21 located at the entry stall can be used to dip or spray or otherwise apply a sanitizing solution to the animal's teats and then follow the application with a rinse or wipe to remove the solution. After the pre-dipping operation, the animal is directed by the opening of one gate 20A or the other 20B into one or the other of the corridors 18. As animals move one-way along the corridors, a gate 12A in a selected stall is opened. Opening a gate 12A as shown in FIG. 1 blocks the corridor and directs the animal into a stall. As the animal enters a stall, sensor 44 is triggered and a signal is sent to the controller 42 (FIG. 2) to alert the controller that a new cow has entered the stall.

The controller acts in response to this signal and first delivers the information to the display 34 on the platform. For example, the display may indicate the event (a new animal is available for milking) and the location of the event (the selected stall). After considering the display, an operator on the platform provides an acknowledgment by making an entry on the keypad 32. Upon receiving the acknowledgement, the controller activates the motor 40 for moving the platform to the stall where the event has occurred. Upon reaching the selected stall the motor stops to allow the operator to tend to the new animal. This may include pre-dipping or washing or drying the animal's udder (if that operation was not done previously at the entry stall) and attaching the teat cups of the milking apparatus.

During the course of a milking operation, one or more of the teat cups of the milking apparatus may inadvertently detach from the animal's teats. In this case the fault sensor 48 is triggered and a signal is sent to the controller to indicate the fault event and the location. The controller provides the relevant information of the display 34. After receiving the operator's acknowledgement by an entry on the keypad, the controller causes the motor to move the platform to the location of the event so the operator can correct the fault.

As the milking of an animal nears completion, a milk meter (not shown) for indicating when the animal is done senses the diminished flow. When this happens, a sensor 46 associated with the milk meter is triggered and a signal is sent to the controller 42. The controller again provides information on the display as to the event (done animal) and its location. The operator issues and acknowledgement and is delivered to the stall where the event has occurred so the milking apparatus can be detached. After the milking apparatus is removed, the operator can apply a post-dipping treatment to the animal. A gate 12B then is opened so the animal is able only to move forward from the stall and into the corridor. The animal proceeds along the one-way corridor in the direction of the arrows 27 and exits the parlor through the exit stall 22.

As an alternative to the operator applying a post-dipping treatment to the animal at the milking stall, the treatment instead can be applied at the exit stall 22. In this respect the exit stall may be equipped with a robotic or automatic post-dip apparatus 23 for spraying, dipping or otherwise applying a sanitizing solution to the teats of the animal. The animal then simply is detained in the exit stall 22 for a time sufficient to carry out the post-dipping procedure.

It should be appreciated that the events requiring attention of the operator can occur in any sequence and at remote locations along the entire length of the two rows of milking stalls. Accordingly, a platform for moving the operator greatly reduces physical exertion. Also the use of sensors and a controller as described to sense an event and deliver the operator to the location of the event still further reduces the operator's effort. To provide even more efficiency, the controller can be programmed to give priority to selected events and to deliver the operator to the location where the priority event has occurred rather than to address the events in the sequence in which they occur. For example a fault signal may take priority over a new cow or a done cow signal.

To further automate the milking system, the opening and closing of the various gates 12A, 12B and 20A, 20B also can be controlled by the controller 42. In this case the controller is programmed to track which stalls are available or are near to being available (milk flow diminishing) so as to open and close the appropriate gates to direct an animal; to a next available stall.

While the invention has been described as having a single platform from which both rows of milking stalls are serviced, it should be appreciated that the milking parlor can employ two such platforms. In this case the platforms would be guided along parallel tracks so the two platforms would pass side-by-side. Each platform would be used to service one of the rows of milking stalls and each would have a single working edge extending to one wall of the operator's pit. The opposite side of each platform would have a fence or other barrier to prevent the operator from inadvertently falling from the platform when backing away from the working side of the platform.

Thus it should be appreciated that the present invention accomplishes its intended objects in providing a milking system that includes a milking parlor having improved animal through put while greatly decreasing the physical effort required to service animals in a large milking parlor. The one-way movement of the animals through the milking parlor having a controlled entry stall and exit stall eases congestion and manages traffic flow through the parlor. The controlled entry stall and exit stall further affords the opportunity to detain each animal for pre- and post-dipping procedures. The invention also allows for the operator to have direct access to the animals from a movable platform. The movement of the operator is accomplished by a drive mechanism incorporated into the floor of the milking parlor and includes an arrangement that prevents manure and other wastes and external contaminants from fouling the drive mechanism.

Having described the invention in detail, what is claimed as new is:

1. A milking system comprising:

a) a milking parlor having an entry stall at one end and an exit stall at an opposite end through which entry and exit stalls all of the animals pass, each of the entry and exit stalls being of a size sufficient to accommodate a single animal and each of the entry and exit stalls configured to detain a single animal therein prior to passing through; and b) a plurality of milking stalls arranged at spaced intervals along a one-way path of travel through the milking parlor from the entry stall to the exit stall.

2. A milking system as in claim 1 including entry stall gates operable for detaining a single animal in the entry stall prior to the passage of the animal through the entry stall and the entry of the animal onto the one-way path.

3. A milking system as in claim 2 wherein:

a) the milking stalls are arranged in two parallel rows separated by an aisle, each of the milking stalls opening out of and into a corridor extending along side each of the two rows of milking stalls; and b) the entry stall gates being selectively operable to provide an opening from the entry stall to one or the other of the corridors.

4. A milking system as in claim 1 including means at the entry stall for performing a pre-dipping procedure on the detained animal.

5. A milking system as in claim 1 wherein at least one of the entry stall and exit stall including means to permit respectively a pre- or a post-dipping procedure on a detained animal.

6. A milking system as in claim 1 wherein:

a) the milking stalls are arranged in two parallel rows separated by an elongated pit extending substantially the length of the parallel rows;

b) a person mover in the pit that is movable substantially the full length of the pit from one end to another;

c) the person mover including a generally rectangular platform for supporting a standing operator, the platform having a working side facing at least one of the parallel rows and the working side extending out to a wall of the pit and extending parallel to the pit wall to allow the operator to service an animal in a milking stall in the at least one of the parallel rows; and d) the proximity of the working side to the pit wall providing a safety means for preventing the standing operator from stepping or falling off the working side of the platform and into the pit.

7. A milking system as in claim 6 wherein the platform has two working sides extending to opposite walls of the pit so the operator is able to access an animal in the milking stalls in each of the parallel rows and the proximity of each working side to an adjacent pit wall providing a safety means for preventing the standing operator from stepping or falling off either of the working sides and into the pit.

8. A milking system as in claim 6 wherein the person mover includes two of the platforms movable in parallel paths, each of the platforms having one working side facing one of the parallel rows of milking stalls and extending to a wall of the pit.

9. A milking system as in claim 6 including:

a) a sensor located at each milking stall adapted to issue a signal on the occurrence of one of the entry of an animal to be milked into a milking stall, the disengagement of a milking cup from an animal in the milking stall and the completion of the milking of an animal in the milking stall; and b) means operating responsive to the signal to move the platform to the milking stall that is the source of the signal.

10. A milking system as in claim 1 wherein:

a) the milking parlor has two parallel corridors, which together with the entry stall and the exit stall define the one-way path of travel through the parlor;

b) the plurality of milking stalls being arranged at spaced intervals in two rows, one row extending alongside each corridor;

c) each of the milking stalls having selectively operable entrance and exit gates for directing an animal in a one-way direction into a milking stall and then back into the corridor; and d) the entrance gates being components of the entry stall and the entrance gates being selectively operable to provide an opening from the entry stall into one or the other of the corridors.

11. A milking system comprising:

a) a plurality of milking stalls arranged in two parallel rows separated by an elongated pit, each stall being accessible from the pit and the stalls being at an elevated level relative to the floor level of the pit;

b) a generally rectangular platform disposed in the elongated pit, the platform being movable substantially the full length of the pit from one end to the other and having opposite working sides extending to opposite side walls of the pit thereby allowing an operator standing on the platform to have direct access to the animals in either of the rows for connecting the animals to a milking machine without leaving the platform; and c) drive means for moving and stopping the platform adjacent a selected one of the milking stalls.

12. A milking system as in claim 11 comprising:

a) a sensor located at each milking stall adapted to issue a signal on the occurrence of one of the entry of an animal to be milked into a milking stall, the disengagement of a milking cup from an animal in the milking stall or the completion of the milking of an animal in the milking stall; and b) the drive means operating responsive to the signal to move the platform to the milking stall that is the source of the signal.

13. A milking system as in claim 11 wherein the drive means comprises:

a) a guide slot opening through the floor of the pit, the slot extending substantially the length of the pit;

b) a driven element traveling in the guide slot;

c) a member extending down from the platform and into the guide slot, the member being attached to the driven element for moving the platform along the pit; and d) a protective flexible cover for the opening of the slot, the cover being fixed against longitudinal movement with respect to the pit floor and being free to move vertically with respect to the pit floor to accommodate the passage of the member and thereafter being returned to a position covering the slot after passage of the member.

14. A milking apparatus as in claim 13 including a displacement means for lifting the protective cover from the slot to accommodate the passage of the member and thereafter returning the cover to the slot after passage of the member, the displacement means comprising a set of roller pairs depending from the underside of the platform with the flexible cover being passed under and over the rollers of each pair to respectively lift and lower the protective cover as the platform is moved along the slot.

15. A milking system comprising:
a) a plurality of milking stalls arranged in two parallel rows on either side of a central aisle, each of the milking stalls being accessible from the aisle;
b) a person mover movable from one end of the aisle to the other;
c) a sensor located at each milking stall adapted to issue a signal on the occurrence of one of the entry of an animal to be milked into a milking stall, the disengagement of a milking cup from an animal in the milking stall and the completion of the milking of an animal in the milking stall; and
d) a controller acting responsive to the signal to cause the movement of the person mover to the milking stall that is the source of the signal.

16. A milking system as in claim 15 including:
a) a display and an operator activated input on the person mover, both the display and the input being operatively connected to the controller; and
b) the controller operating to place information on the display pertaining to the next destination of the person mover and the controller delaying the movement of the person mover until after viewing of the information on the display has been acknowledged by activation of the operator activated input.

17. A milking system as in claim 15 wherein:
a) the aisle is a pit having a floor disposed below the level of the milking stalls;
b) the person mover including a generally rectangular platform having a width that extends substantially the full width of the pit allowing an operator standing on the platform to have direct access from the platform to the animals in the milking stalls in both rows; and
c) means for moving the platform along the pit and stopping the platform adjacent one of the milking stalls selected independently of an operator input.

18. A method of operating a milking parlor comprising:
a) providing a plurality of milking stalls arrange in two parallel rows separated by a central aisle;
b) sensing an event occurring at any one of the stalls including the entry of a new animal into a milking stall, a fault occurring during the milking of an animal and a diminishing milk flow from the animal being milked;
c) issuing a signal indicative of the event; and
d) transporting a human operator along the aisle to the location of the event in response to the signal.

19. A method as in claim 18 comprising:
a) detaining an animal at an entry stall to the milking parlor and performing a pre-dipping procedure on the animal to prepare the animal for milking; and
b) selectively operating gates at the entry stall for directing the detained animal to one or another of the parallel rows.

20. A method as in claim 19 including a person mover for transporting a human operator along the aisle the person mover having a display and an input station, the method further comprising:
a) displaying to a human operator information regarding the next destination of the person mover; and
b) delaying the movement of the person mover to that location until after an acknowledging input from the human operator.

21. A milking system comprising:
a) a milking parlor having an entry and an exit stall;
b) a plurality of milking stalls arranged at spaced intervals along a one-way path through the milking parlor from the entry stall to the exit;
c) two parallel corridors which together with the entry stall and the exit stall define the one-way path of travel through the parlor;
d) the plurality of milking stalls being arranged at spaced intervals in two rows, one row extending alongside each corridor;
e) each of the milking stalls having selectively operable entrance and exit gates for directing an animal in a one-way direction into a milking stall and then back into the corridor; and
f) the gates being components of an entry stall and being selectively operable to provide an opening from the entry stall into one or the other of the corridors.

22. A method of operating a milking parlor comprising:
a) arranging a plurality of milking stalls in the parlor in two parallel rows separated by a central aisle, each of the rows extending alongside an exterior corridor in a one-way path of travel, the paths of travel having a common entry stall at one end and a common exit stall at an opposite end;
b) selectively operating gates at the entry stall for directing an animal to one or another of the corridors;
c) selectively opening entrance and exit gates in each of the stalls for directing an animal in a one-way path from the corridor into a milking stall and from the milking stall into the corridor;
d) detaining a single animal at one of the entry and exit stalls prior to passing through; and
e) performing one of a pre-dipping and post-dipping process on the detained animal.

23. A method as in claim 22 comprising:
a) issuing a signal from a milking stall in response to one of the entry of an animal into a milking stall, the disengagement of a milking cup from an animal in the milking stall and the completion of the milking of an animal in the milking stall; and
b) moving a person mover along the aisle in responsive to the signal and stopping the person mover adjacent the stall that is the source of the signal.

* * * * *